(12) United States Patent
Hasegawa et al.

(10) Patent No.: US 11,111,348 B2
(45) Date of Patent: Sep. 7, 2021

(54) METHOD FOR TREATING SURFACE OF RESIN MATERIAL LAYER AND RESIN MATERIAL

(71) Applicants: MITSUBISHI HEAVY INDUSTRIES, LTD., Tokyo (JP); National University Corporation KOBE University, Hyogo (JP)

(72) Inventors: Koichi Hasegawa, Tokyo (JP); Toshio Abe, Tokyo (JP); Kiyoka Takagi, Tokyo (JP); Takashi Nishino, Hyogo (JP); Takuya Matsumoto, Hyogo (JP); Akira Miyagaki, Hyogo (JP)

(73) Assignees: MITSUBISHI HEAVY INDUSTRIES, LTD., Tokyo (JP); NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 403 days.

(21) Appl. No.: 16/305,155

(22) PCT Filed: Mar. 31, 2017

(86) PCT No.: PCT/JP2017/013544
§ 371 (c)(1),
(2) Date: Nov. 28, 2018

(87) PCT Pub. No.: WO2017/208608
PCT Pub. Date: Dec. 7, 2017

(65) Prior Publication Data
US 2020/0317876 A1    Oct. 8, 2020

(30) Foreign Application Priority Data

May 31, 2016  (JP) .............................. JP2016-109228

(51) Int. Cl.
*C08J 7/12*    (2006.01)

(52) U.S. Cl.
CPC ........... *C08J 7/126* (2013.01); *C08J 2371/00* (2013.01)

(58) Field of Classification Search
CPC ...... C08J 7/12; C08J 2371/00; C08J 2381/06; C08G 65/48; C08G 65/485
See application file for complete search history.

(56) References Cited

U.S. PATENT DOCUMENTS 3,780,496 A * 12/1973 Ward, III ............... B01D 71/52
                                                            95/53
4,596,860 A *  6/1986 Percec ................... B01D 71/50
                                                            210/500.41
(Continued)

FOREIGN PATENT DOCUMENTS

JP        60-133006        7/1985
JP        62-269704       11/1987
(Continued)

OTHER PUBLICATIONS

Bhole, European Polymer Journal 41 (2005) 2461-2471 (Year: 2005).*

(Continued)

*Primary Examiner* — Robert C Boyle
(74) *Attorney, Agent, or Firm* — Wenderoth, Lind & Ponack, L.L.P.

(57) ABSTRACT

A method is for treating a surface of a resin material layer. The method includes a first step of introducing as a substituent at least one selected from the group consisting of an acid halide and an alkyl halide into an aromatic polyether-based resin included in the resin material layer by Friedel-Crafts reaction.

6 Claims, 6 Drawing Sheets

(56) References Cited

U.S. PATENT DOCUMENTS

| | | | |
|---|---|---|---|
| 4,923,932 A * | 5/1990 | Katayose | C08F 283/08 |
| | | | 525/390 |
| 4,948,508 A | 8/1990 | Nakagawa et al. | |
| 4,978,724 A | 12/1990 | Clark | |
| 6,821,418 B2 * | 11/2004 | Huang | B01J 20/26 |
| | | | 210/198.2 |
| 2005/0170183 A1 | 8/2005 | Gehlen | |
| 2009/0305381 A1 | 12/2009 | Bilek et al. | |

FOREIGN PATENT DOCUMENTS

| | | |
|---|---|---|
| JP | 1-284303 | 11/1989 |
| JP | 1-284309 | 11/1989 |
| JP | 5-171041 | 7/1993 |
| JP | 2005-528479 | 9/2005 |
| JP | 2009-529589 | 8/2009 |

OTHER PUBLICATIONS

International Search Report dated Jun. 27, 2017 in International (PCT) Application No. PCT/JP2017/013544.
Written Opinion of the International Searching Authority dated Jun. 27, 2017 in International Application No. PCT/JP2017/013544, with English translation.

* cited by examiner

METHOD FOR TREATING SURFACE OF RESIN MATERIAL LAYER AND RESIN MATERIAL

FIELD

The present invention relates to a method for treating a surface of a resin material layer and a resin material.

BACKGROUND

Conventionally, a polyphenylene sulfide resin composition having excellent heat resistance, mechanical properties, chemical resistance, and dimensional stability and being used for various applications such as electric/electronic equipment parts and automotive parts has been developed (for example, refer to Patent Literature 1). In this polyphenylene sulfide resin composition, the adhesiveness of the polyphenylene sulfide resin is improved by adding a superabsorbent resin to the polyphenylene sulfide resin.

CITATION LIST

Patent Literature

Patent Literature 1: Japanese Unexamined Patent Application Publication No. 05-171041

SUMMARY

Technical Problem

An aromatic polyetheretherketone (PEEK) has excellent mechanical properties, electrical insulation properties, heat resistance, and chemical resistance and is used for small parts of a structural material for aerospace as a single material or a fiber-reinforced composite material. The aromatic polyetheretherketone is not only comparatively expensive but also has poor hydrophilicity, paintability, and adhesiveness. Therefore, improvements in hydrophilicity, paintability, and adhesiveness by surface treatment have been studied. The aromatic polyetheretherketone has a non-polar molecular structure and thus sufficient surface washing and mechanical polish are difficult by general surface treatment that combines surface washing and mechanical polishing. Therefore, improvements in hydrophilicity, paintability, and adhesiveness by surface treatment with etching, corona discharge, and plasma treatment have been studied.

The surface treatment by etching, however, results in insufficient introduction of polar functional groups such as hydroxy groups into the surface of the polyetheretherketone by oxidation in etching and thus the effect such as improvement in the adhesiveness by the surface treatment is insufficient. The surface treatment by corona discharge and plasma treatment allows polar functional groups to be introduced more efficiently than etching. Advantageous effects such as improvement of the adhesiveness by the surface treatment by corona discharge and plasma treatment, however, may decrease with the elapsed time. Therefore, a method for treating the surface of polyetheretherketone capable of improving various physical properties such as adhesiveness of the resin material layer including polyetheretherketone or the like has been desired.

The present invention has been made in view of such circumstances, and an object of the invention is to provide a method for treating the surface of a resin material layer capable of improving various physical properties of the resin material layer and a resin material.

Solution to Problem

A method according to the present invention is for treating a surface of a resin material layer, and includes a first step of introducing as a substituent a compound for substitution reaction into an aromatic polyether-based resin included in the resin material layer by Friedel-Crafts reaction.

According to the method for treating the surface of the resin material layer according to the present invention, the compound for substitution reaction introduced into the aromatic polyether-based resin in the resin material layer is introduced as a substituent by Friedel-Crafts reaction. Consequently, the compound for substitution reaction having a substituent capable of expressing arbitrary physical properties can be introduced into the aromatic polyether-based resin in the resin material layer and various physical properties of the resin material layer, which are insufficient in the case where conventional physical and chemical surface treatment is applied, can be improved.

In the method for treating a surface of a resin material layer according to the present invention, the substituent preferably has an unsaturated bond. With this method, a hydrophilic functional group can be introduced by oxidation of the unsaturated bond in the substituent and thus the hydrophilic functional group can be easily introduced.

In the method for treating a surface of a resin material layer according to the present invention, the aromatic polyether-based resin preferably includes at least one selected from the group consisting of an aromatic polyetherketone, an aromatic polyetheretherketone, an aromatic polyetherketoneketone, an aromatic polyetheretherketoneketone, an aromatic polyetherketone ester, an aromatic polycarbonate, and an aromatic polyethersulfone. With this method, the aromatic polyetherketone having excellent mechanical properties, electrical insulation, heat resistance, and chemical resistance is introduced into the resin material layer and thus heat resistance, mechanical properties, chemical resistance, dimensional stability, and the like of the resin material layer are further improved.

In the method for treating a surface of a resin material layer according to the present invention, the compound for substitution reaction is preferably at least one selected from the group consisting of an acid halide and an alkyl halide. With this method, at least one compound selected from the group consisting of acid halides and alkyl halides can be introduced into the aromatic polyether-based resin by Friedel-Crafts reaction and thus the compound for substitution reaction can be easily introduced.

In the method for treating a surface of a resin material layer according to the present invention, the acid halide is preferably an acid halide having a carbon number of 5 to 15. With this method, the compound for substitution reaction can be introduced into the aromatic polyether-based resin by Friedel-Crafts acylation reaction and thus Friedel-Crafts reaction can be easily controlled.

The method for treating a surface of a resin material layer according to the present invention preferably further includes a second step of introducing a hydrophilic functional group into the substituent. With this method, a hydrophilic functional group is introduced into the substituent originated from the compound for substitution reaction introduced into the aromatic polyether-based resin in the resin material layer by Friedel-Crafts reaction and thus the hydrophilic functional group can be introduced into a region separated by a predetermined number of carbon atoms from the main chain of the polyether-based resin in the resin material layer. This prevents the hydrophilic functional group from penetrating into the molecular structure of the aromatic polyether-based resin and, at the same time, causes interaction of the hydrophilic functional group with adhesive and paint on the surface of the resin material layer. Consequently, not only the hydrophilicity and paintability, but also the adhesiveness of the resin material layer, which is insufficient in the case where conventional physical and chemical surface treatment is applied, can be improved.

In the method for treating a surface of a resin material layer according to the present invention, at the second step, the hydrophilic functional group is preferably introduced by epoxidizing the unsaturated bond in the substituent. With this method, the hydrophilic functional group can be introduced by epoxidation into the unsaturated bond in the substituent and thus the hydrophilic functional group can be easily introduced. In addition, the epoxy group introduced into the substituent reacts with components such as paint and adhesive on the surface of the resin material layer to form a covalent bond and thus the adhesiveness of the resin material layer can be further improved.

A resin material of the present invention includes a resin material layer obtained by the above-described method for treating a surface of a resin material layer.

According to the resin material layer according to the present invention, the compound for substitution reaction introduced into the aromatic polyether-based resin in the resin material layer is introduced as the substituent by Friedel-Crafts reaction. This allows the compound for substitution reaction having a substituent capable of expressing arbitrary physical properties to be introduced into the aromatic polyether-based resin in the resin material layer and various physical properties of the resin material layer, which are insufficient in the case where conventional physical and chemical surface treatment is applied, to be improved.

Advantageous Effects of Invention

According to the present invention, the method for treating the surface of the resin material layer capable of improving various physical properties of the resin material layer and the resin material can be provided.

DESCRIPTION OF EMBODIMENTS

Hereinafter, each embodiment of the present invention will be described in detail with reference to the attached drawings. The present invention is not limited to the following each embodiment and can be implemented with adequate modifications.

Figure 1A:
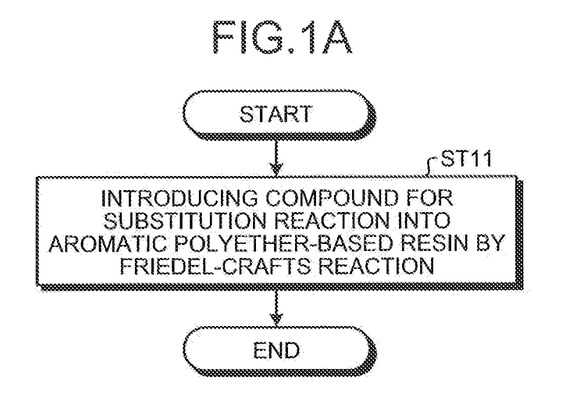
FIG. 1A is a flow chart schematically illustrating a method for treating the surface of the resin material according to a first embodiment of the present invention.
Figure 1B:
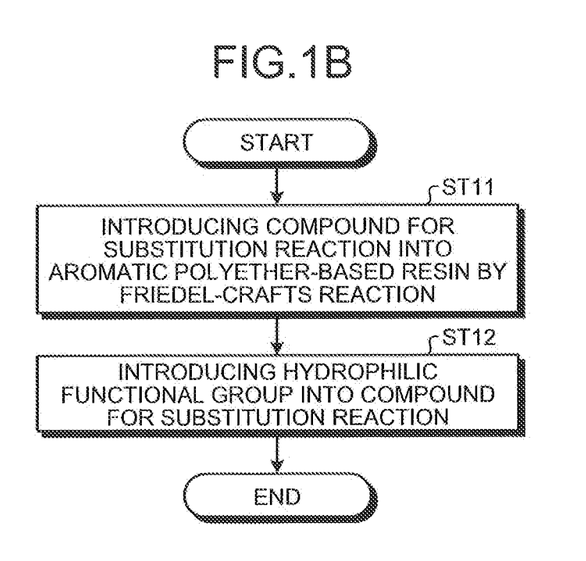
FIG. 1B is a flow chart schematically illustrating a method for treating the surface of the resin material according to a second embodiment of the present invention.

FIG. 1A is a flow chart schematically illustrating the method for treating the surface of the resin material according to the first embodiment of the present invention and FIG. 1B is a flowchart illustrating the method for treating the surface of the resin material according to the second embodiment of the present invention. As illustrated in FIG. 1A, the method for treating the surface of the resin material layer according to the first embodiment of the present invention includes a first step ST11 of introducing the compound for substitution reaction into the aromatic polyether-based resin included in the resin material layer as the substituent by Friedel-Crafts reaction. As illustrated in FIG. 1B, the method for treating the surface of the resin material layer according to the second embodiment of the present invention includes a second step ST12 of introducing the hydrophilic functional group into the substituent of the compound for substitution reaction introduced into the aromatic polyether-based resin in addition to the first step ST11 in the above first embodiment. Hereinafter, each of the steps will be described in detail.

First Step

At the first step ST11, the compound for substitution reaction is introduced into the aromatic polyether-based resin as the substituent by Friedel-Crafts reaction in the presence of a Lewis acid catalyst. This allows, in the first embodiment, the compound for substitution reaction having a substituent capable of expressing arbitrary physical properties to be introduced into the aromatic polyether-based resin in the resin material layer. Consequently, various physical properties of the resin material layer, which are insufficient in the case where conventional physical and chemical surface treatment is applied, can be improved. As Friedel-Crafts reaction, Friedel-Crafts acylation may be used or Friedel-Crafts alkylation may be used.

Examples of the Lewis acid catalyst include $AlCl_3$, $ZnCl_2$, $FeCl_3$, $TiCl_4$, $SnCl_4$ and $Sc(OTf)_3$. Of these Lewis acid catalysts, $AlCl_3$ is preferable from the viewpoint of efficient introduction of the compound for substitution reaction into the aromatic polyether-based resin.

Examples of the aromatic polyether-based resin include an aromatic polyether (PE), an aromatic polyetherketone (PEK), an aromatic polyetheretherketone (PEEK), an aromatic polyetherketoneketone (PEKK), an aromatic polyetheretherketoneketone (PEEKK), a polyetherketone ester, an aromatic polycarbonate, and an aromatic polyethersulfone. These aromatic polyether-based resins may be used singly or in combination of two or more of the aromatic polyether-based resins.

Of these aromatic polyether-based resins, at least one resin selected from the group consisting of the aromatic polyether, the aromatic polyetheretherketone, the aromatic polyetherketoneketone, and the aromatic polyetheretherketone is preferable as the aromatic polyether-based resin from the viewpoint of obtaining a resin material layer having excellent adhesiveness, at least one resin selected from the group consisting of the aromatic polyetherketone, the aromatic polyetheretherketone, and the aromatic polyetherketoneketone is more preferable, and the aromatic polyetheretherketone is further preferable from the viewpoint that wear resistance, heat resistance, insulating properties, and processability are also excellent.

As the aromatic polyether-based resin, commercially available products may be used. With respect to these commercially available products, one kind of the aromatic polyether-based resin may be used alone or multiple kinds of the aromatic polyether-based resins may be used in combination of two or more of the aromatic polyether-based resins. As the aromatic polyether-based resin, a modified aromatic polyetherketone may be used.

The reaction solvent for the Friedel-Crafts reaction is not particularly limited as long as the solvent does not react with the aromatic polyether-based resin and has a comparatively high boiling point. The boiling point of the reaction solvent is preferably 65° C. or higher and more preferably 150° C. or higher from the viewpoint of efficiently carrying out Friedel-Crafts reaction. Examples of the reaction solvent include 1,2,4-trichlorobenzene, chloroform, dioxane, toluene, xylene, and tetrachloroethane. Of these solvents, chloroform is preferable as the reaction solvent from the viewpoint of obtaining the resin material layer having excellent adhesiveness.

Compound for Substitution Reaction

The compound for substitution reaction is not particularly limited as long as the compound can introduce a hydrophilic functional group into the molecule. As the compound for substitution reaction, an alkyl halide, acid halide, and acid anhydride having an alkyl chain having a carbon number of 5 to 20, a perfluoroalkyl group, a polyethylene glycol group, a silylated hydroxy group, and a terminal double bond and a terminal triple bond in the molecular structure are used. Examples of the alkyl halide include an alkyl chloride, an alkyl bromide, and an alkyl iodide. Examples of the acid halide include an acid chloride, an acid bromide, and an acid iodide.

As the alkyl halide, for example, an alkyl halide having a carbon number of 5 to 15 or the like is used. Examples of the alkyl halide having a carbon number of 5 to 15 include alkyl chlorides having a carbon number of 5 to 15 such as 4-chloro-1-pentene, 5-chloro-1-hexene, 6-chloro-1-heptene, 7-chloro-1-octene, 8-chloro-1-nonene, 9-chloro-1-decene, 10-chloro-1-undecene, 11-chloro-1-dodecene, 12-chloro-1-tridecene, 13-chloro-1-tetradecene, and 14-chloro-1-pentadecene; alkyl bromides having a carbon number of 5 to 15 such as 4-bromo-1-pentene, 5-bromo-1-hexene, 6-bromo-1-heptene, 7-bromo-1-octene, 8-bromo-1-nonene, 9-bromo-1-decene, 10-bromo-1-undecene, 11-bromo-1-dodecene, 12-bromo-1-tridecene, 13-bromo-1-tetradecene, and 14-bromo-1-pentadecene; and alkyl iodides having a carbon number of 5 to 15 such as 4-iodo-1-pentene, 5-iodo-1-hexene, 6-iodo-1-heptene, 7-iodo-1-octene, 8-iodo-1-nonene, 9-iodo-1-decene, 10-iodo-1-undecene, 11-iodo-1-dodecene, 12-iodo-1-tridecene, 13-iodo-1-tetradecene, and 14-iodo-1-pentadecene.

As the acid halide, for example, an acid halide having carbon number of 5 to 15 or the like is used. Examples of the acid halide having a carbon number of 5 to 15 include acid chlorides having a carbon number of 5 to 15 such as 4-pentenoyl chloride, 5-hexenoyl chloride, 6-hepteninoyl chloride, 7-octenoyl chloride, 8-nonanoyl chloride, 9-decenoyl chloride, 10-undecenoyl chloride, 11-dodecenoyl chloride, 12-tridecenoyl chloride, 13-tetradecenoyl chloride, 14-pentadecenoyl chloride, 4-chlorobenzoyl chloride, 4-bromobenzoyl chloride, and 4-iodobenzoyl chloride; acid bromides having a carbon number of 5 to 15 less such as 4-pentenoyl bromide, 5-hexenoyl bromide, 6-hepteninoyl bromide, 7-octenoyl bromide, 8-nonanoyl bromide, 9-decenoyl bromide, 10-undecenoyl bromide, 11-dodecenoyl bromide, 12-tridecenoyl bromide, 13-tetradecenoyl bromide, 14-pentadecenoyl bromide 4-chlorobenzoyl bromide, 4-bromobenzoyl bromide, and 4-iodobenzoyl bromide; and acid iodides having a carbon number of 5 to 15 such as 4-pentenoyl iodide, 5-hexenoyl iodide, 6-hepteninoyl iodide, 7-octenoyl iodide, 8-nonanoyl iodide, 9-decenoyl iodide, 10-undecenoyl iodide, 11-dodecenoyl iodide, 12-tridecenoyl iodide, 13-tetradecenoyl iodide, 14-pentadecenoyl iodide, 4-chlorobenzoyl iodide, 4-bromobenzoyl iodide, and 4-iodobenzoyl iodide.

As the compound for substitution reaction, from the viewpoint of small surface energy and prevention of the reduction in the surface treatment effect due to penetration of the functional group into the molecular structure of the resin material layer, alkyl halides and acid halides are preferable, alkyl halides and acid halides having a carbon number of 5 to 15 are more preferable, alkyl halides and acid halides having a carbon number of 10 to 15 are further preferable, acid halides having a carbon number of 10 to 15 are further more preferable, and 10-undecenoyl chloride is particularly preferable. Use of 10-undecenoyl chloride provides formation of a covalent bond, which is stronger than a hydrogen bond, to the components such as paint and adhesive on the surface of the resin material layer and thus realization of higher adhesion strength can be expected. From the viewpoint that the adhesiveness of the resin material layer can be improved by introducing the hydrophilic functional group by oxidation, the compound for substitution reaction is preferably a compound having an unsaturated bond, when introduced as the substituent into the resin material layer.

As the reaction conditions of Friedel-Crafts reaction, Friedel-Crafts reaction is carried out, for example, by immersing the resin material layer including the aromatic polyether-based resin in a solution in which a predetermined amount of the Lewis acid catalyst and a predetermined amount of the compound for substitution reaction are dissolved in an atmosphere of dry air, or an inert gas such as nitrogen and argon at a predetermined temperature (for example, in a range of 60° C. to 160° C.) for a predetermined period of time (for example 2 hours or longer). The hydrophilic substituent can be introduced into the aromatic polyether-based resin according to these conditions.

The amount of the Lewis acid catalyst to be added in Friedel-Crafts reaction is preferably 20 parts by mass to 150 parts by mass, more preferably 30 parts by mass to 125 parts by mass, and further preferably 40 parts by mass to 100 parts by mass relative to 100 parts by mass of the aromatic polyether.

The amount of the compound for substitution reaction to be added in Friedel-Crafts reaction is preferably 5 parts by mass to 50 parts by mass, more preferably 10 parts by mass to 40 parts by mass, and further preferably 14 parts by mass to 35 parts by mass relative to 100 parts by mass of the aromatic polyether.

Second Step

At the second step, a hydrophilic functional group is introduced into the substituent originated from the compound for substitution reaction by immersing the aromatic polyether-based resin, into which the substituent originated from the compound for substitution reaction is introduced, in a reaction solvent in which an oxidizing agent or the like is dissolved. This allows, in the second embodiment, the hydrophilic functional group to be introduced into a region separated by a predetermined number of carbon atoms from the main chain of the aromatic polyether-based resin in the resin material layer. Consequently, penetration of the hydrophilic functional group into the molecular structure of the aromatic polyether-based resin can be prevented. The hydrophilic functional group interacts with the adhesive and paint on the surface of the resin material layer and thus not only are hydrophilicity and paintability improved but also the adhesiveness of the resin material layer, which is insufficient in the case where conventional physical and chemical surface treatment is applied, can be improved.

Examples of the hydrophilic functional group introduced at the second step include a sulfo group, an amino group, an amino group, an amide group, an imino group, a hydroxy group, a mercapto group, a hydrazino group, a carboxy group, a quaternary ammonium group, a sulfate ester group, a phosphate ester group, an oxirane group (epoxy group), and an oxetane group. Of these hydrophilic functional groups, the hydroxy group, the carboxy group, and the epoxy group are preferable as the hydrophilic functional group from the viewpoint that the adhesiveness of the resin material layer can be further improved and the epoxy group is preferable from the viewpoint of further improving the adhesiveness of the resin material layer by reacting the epoxy group with components such as paint and adhesive on the surface of the resin material layer to form a covalent bond.

As the oxidizing agent, for example, potassium peroxymonosulfate (oxone), a hydrogen peroxide aqueous solution, and peracids such as m-chloroperbenzoic acid are used when an epoxy group as the hydrophilic functional group is introduced into the unsaturated bond originated from the compound for substitution reaction. These oxidizing agents may be used singly or in combination of two or more of the oxidizing agents.

As the reaction solvent, a solvent having a carbonyl group such as acetone, butanone, and pentanone is used. These solvents having a carbonyl group may be used singly or in combination on two or more of the solvents. As the reaction solvent, at least one solvent selected from the group consisting of water, methanol, ethanol, dichloromethane, toluene, ethanol, methanol and t-butyl methyl ether, which has no carbonyl group, may be used in combination with the solvent having a carbonyl group.

As the reaction conditions of the second process, for example, the resin material layer including the aromatic polyether-based resin into which the compound for substitution reaction is introduced is immersed into a solution in which a predetermined amount of the oxidizing agent relative to the aromatic polyether-based resin is dissolved in the reaction solvent in an atmosphere of dry air, or an inert gas such as nitrogen and argon at a predetermined temperature of room temperature or lower (for example, in a range of 0° C. to 40° C.) for a predetermined period of time.

The amount of the oxidizing agent to be added at the second step is preferably 300 parts by mass to 1,500 parts by mass, more preferably 400 parts by mass to 1,250 parts by mass, and further preferably 480 parts by mass to 960 parts by mass relative to 100 parts by mass of the aromatic polyether-based resin.

Figure 2:
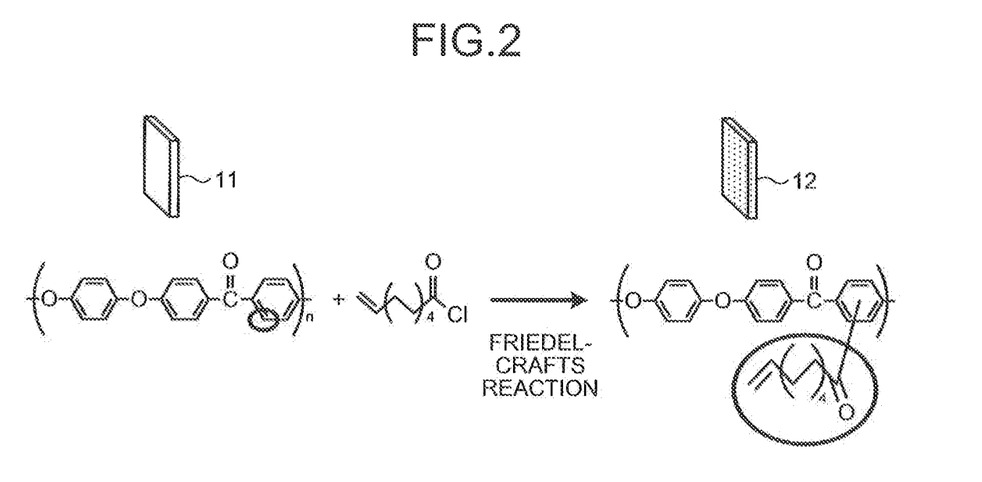
FIG. 2 is an explanatory view of a first step of the method for treating the surface of the resin material layer according to the first embodiment of the present invention.
Figure 3:
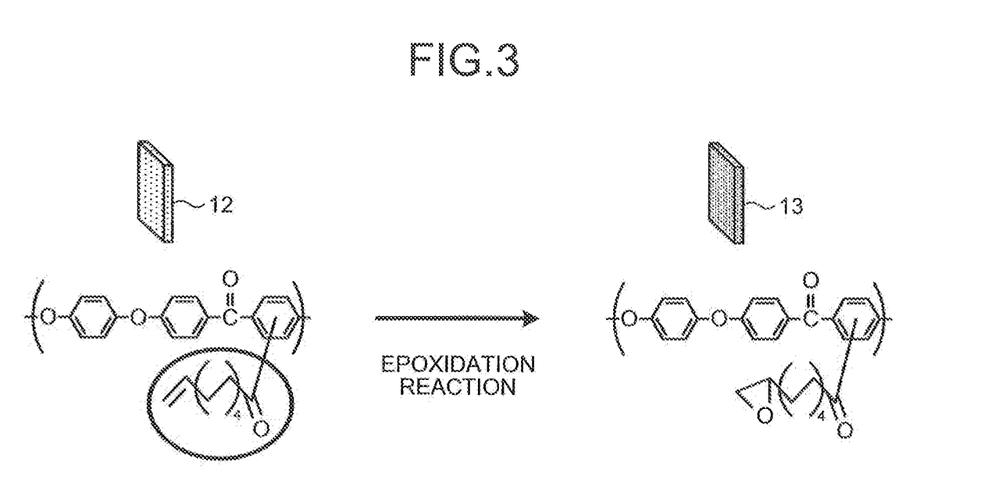
FIG. 3 is an explanatory view of a second step of the method for treating the surface of the resin material layer according to the second embodiment of the present invention.

Subsequently, with reference to FIG. 2 and FIG. 3, the method for treating the surface of the resin material layer according to this embodiment will be specifically described. FIG. 2 is an explanatory view of the first step of the method for treating the surface of the resin material layer according to the first embodiment and FIG. 3 is an explanatory view of the second step of the method for treating the surface of the resin material layer according to the second embodiment. In FIG. 2 and FIG. 3, examples in which the aromatic polyetheretherketone is used as the aromatic polyether-based resin and 10-undecenoyl chloride is used as the compound for substitution reaction are illustrated.

As illustrated in FIG. 2, at the first step, the first resin material layer 11 including the aromatic polyetheretherketone is immersed, in the presence of a Lewis acid catalyst, in the reaction solution in which the acid halide such as 10-undecenoyl chloride is dissolved. According to this process, a second resin material layer 12 in which 10-undecenoyl chloride is randomly introduced as a 10-undecenoyl group into the benzene rings in the repeating constitutional unit of the aromatic polyetheretherketone by Friedel-Crafts acylation reaction is obtained.

Subsequently, as illustrated in FIG. 3, at the second step, a third resin material layer 13 in which the double bond in the 10-undecenoyl group in the aromatic polyetherketone is epoxidized is formed by immersing the second resin material layer 12 into a reaction solution in which a peracid is dissolved. This third resin material layer 13 has an epoxy group as the hydrophilic functional group introduced into the ortho position of the carbonyl group of the aromatic polyetheretherketone through a linear carbon chain. This epoxy group is covalently bonded to the hydroxy group contained in the molecular structure of the adhesive and paint applied to the surface of the third resin material layer 13 and thus the adhesiveness of the third resin material layer 13 is improved. The third resin material layer 13 has the epoxy group as the hydrophilic functional group in a region separated by the molecular chain length of the 10-undecenoyl group from the main chain of the aromatic polyetheretherketone and thus the epoxy group is not penetrated in the main chain of the aromatic polyetheretherketone even when a predetermined period of time has elapsed. As a result, a decrease in the adhesiveness of the third resin material layer 13 can be prevented even when a predetermined period of time has elapsed after the surface treatment.

Figure 4:
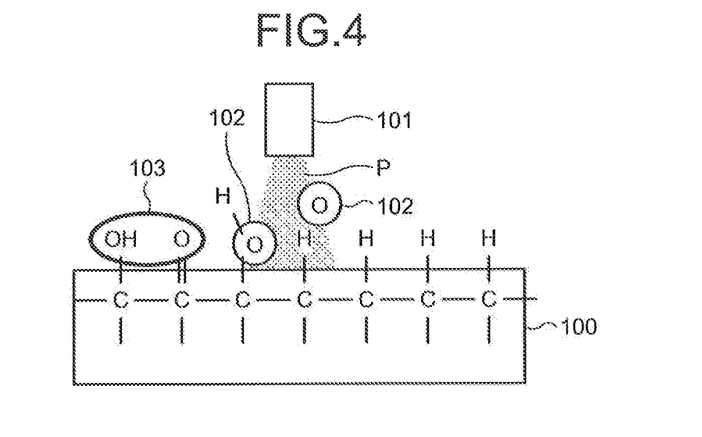
FIG. 4 is an explanatory view of a method for treating the surface of a resin material layer using plasma treatment.

Referring to FIG. 4, as a general method for treating the surface of the resin material layer, a method for treating a surface using plasma treatment will be described. FIG. 4 is an explanatory view of the method for treating the surface of the resin material layer using plasma treatment.

As illustrated in FIG. 4, in the method for treating the surface of the resin material layer using plasma treatment, for example, the surface of the resin material layer 100 including a resin including carbon fibers is irradiated with plasma P using a plasma processing apparatus 101. Due to this irradiation of the plasma P, oxygen radicals 102 are generated and hydrogen atoms in the carbon fibers constituting the resin material layer 100 are substituted with oxygen atoms to introduce the hydrophilic functional groups 103 such as carbonyl groups and hydroxy groups. On the other hand, according to the method for treating the surface of the resin material using plasma treatment, the hydrophilic functional groups 103 are introduced into the main chain of the resin constituting the resin material layer 100. This causes change over time in which the hydrophilic functional groups 103 penetrate into the resin constituting the resin material layer 100 along with the elapsed time after plasma treatment. Consequently, the hydrophilic functional groups existing near the surface of the resin material layer 100 decrease.

Figure 5:
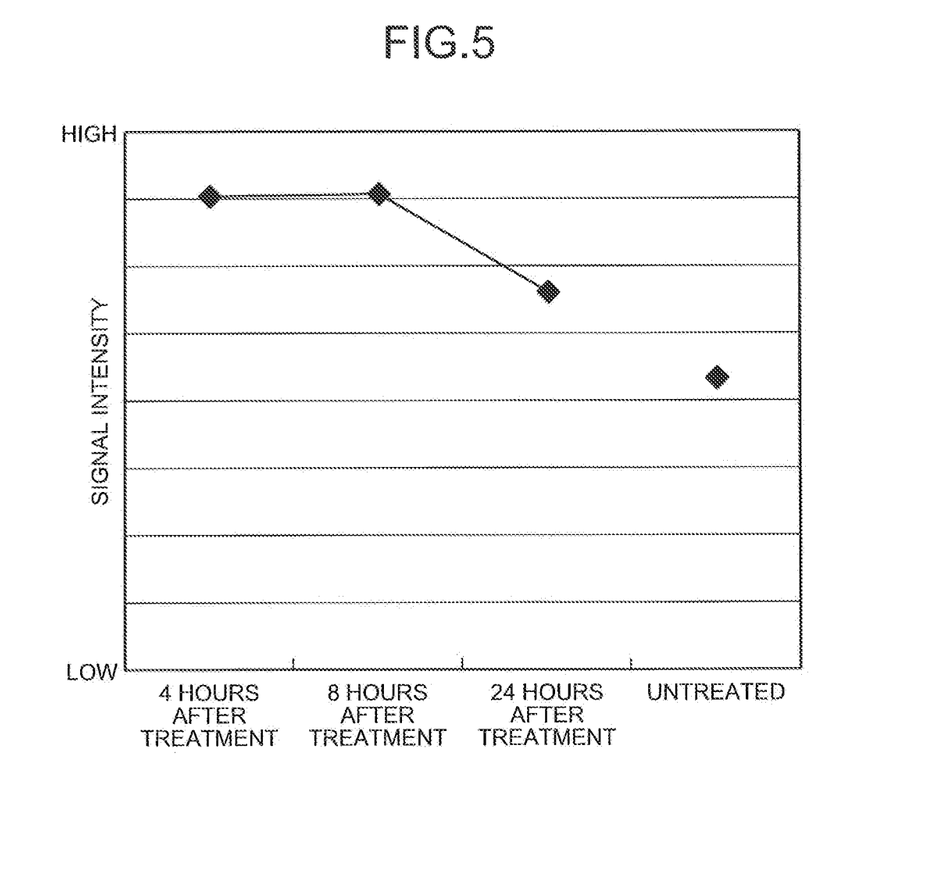
FIG. 5 is a graph illustrating the relation between elapsed time after plasma treatment and signal intensity of the hydrophilic functional group.

FIG. 5 is a graph illustrating the relation between elapsed time after the plasma treatment and signal intensity of the hydrophilic functional group. As illustrated in FIG. 5, application of the plasma treatment to the material in the plasma untreated state results in an increase in the signal intensity due to an increase in the hydrophilic functional groups on the surface of the resin material layer 100 and the signal intensity of the hydrophilic functional group becomes constant in the case where the elapsed time after the plasma treatment process is within 8 hours. On the other hand, the signal intensity of the hydrophilic functional group decreases in the case where the elapsed time after the plasma treatment process exceeds 8 hours. As described above, it can be seen that the conventional method for treating the surface of the resin material layer using the plasma treatment cannot prevent deterioration in the adhesiveness of the resin material layer 100 in the case where a predetermined period of time has elapsed after the surface treatment, whereas the present invention can prevent the deterioration.

According to the first embodiment, as described above, the compound for substitution reaction having the substituent capable of expressing arbitrary physical properties in the aromatic polyether-based resin is introduced by Friedel-Crafts reaction and thus various physical properties of the resin material layer, which are insufficient in the case where conventional physical and chemical surface treatment is applied, can be improved. According to the second embodiment, the hydrophilic functional group can be introduced into a region separated by a predetermined number of carbon atoms from the main chain of the aromatic polyether-based resin in the resin material layer and thus penetration of the hydrophilic functional group into the molecular structure of the aromatic polyether-based resin can be prevented. The hydrophilic functional group interacts with the adhesive and paint on the surface of the resin material layer and thus not only are hydrophilicity and paintability improved but also the adhesiveness of the resin material layer, which is insufficient in the case where conventional physical and chemical surface treatment is applied, can be improved.

EXAMPLE

Hereinafter, the present invention will be described in more detail with reference to Examples and Comparative Examples carried out to clarify the effects according to the present invention. The present invention is not limited by Examples and Comparative Example in any case.

Example 1

Under conditions of 370° C. and 60 MPa with a press machine (model number "10 TON TEST PRESS", manufactured by Gonno Hydraulic Machinery Works Co., Ltd.), 0.2 g of a powdered aromatic polyetheretherketone in a state of sandwiching between aluminum plates through polyimide films was pressed. Thereafter, the sample was slowly cooled to room temperature to prepare a resin material layer having a thickness of 200 µm. Subsequently, the prepared resin material layer was immersed in a reaction solution in which 0.32 g of 4-bromobenzoyl chloride, 1 g of aluminum trichloride ($AlCl_3$), and a reaction solvent were mixed under a nitrogen atmosphere at a predetermined reaction temperature for 7 hours to carry out Friedel-Crafts reaction. The relation between binding energy and intensity was investigated by varying the reaction solvent and the reaction temperature using X-ray photoelectron spectroscopy. Conditions of the reaction solvent and the reaction temperature are listed below.

(1) 66.6 g of chloroform, 23° C.
(2) 66.6 g of chloroform, 43° C.
(3) 66.6 g of chloroform, 70° C.
(4) 65.7 g of 1,2,4-trichlorobenzene, 100° C.
(5) 65.7 g of 1,2,4-trichlorobenzene, 135° C.
(6) 65.7 g of 1,2,4-trichlorobenzene, 150° C.

Figure 6:
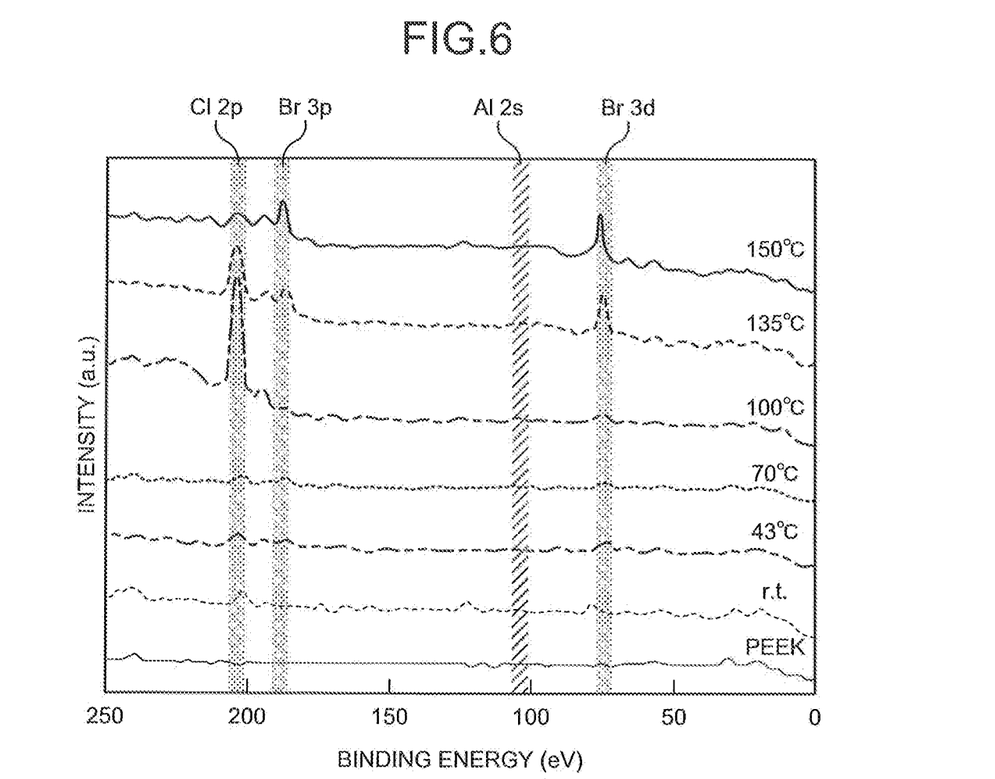
FIG. 6 is a chart illustrating the results of X-ray Photoelectron Spectroscopy (XPS) of the resin material layer according to Example 1.

FIG. 6 is a chart illustrating the results of X-ray Photoelectron Spectroscopy (XPS) of the resin material layer according to Example 1. As can be seen from FIG. 6, the signal of bromine (Br) increases for the aromatic polyetheretherketone (PEEK) treated under the conditions of (3) to (6) in which Friedel-Crafts reaction was carried for by heating at 60° C. or higher as compared to an untreated aromatic polyetheretherketone (PEEK) or the aromatic polyetheretherketone (PEEK) treated under the conditions of (1) and (2). As the reaction temperature became higher, the signal of bromine (Br) increases more. From these results, it can be seen that 4-bromobenzoyl chloride is introduced into the aromatic polyetheretherketone as the substituent by Friedel-Crafts reaction.

Example 2

Under conditions of 370° C. and 60 MPa with a press machine (model number "10 TON TEST PRESS", manufactured by Gonno Hydraulic Machinery Works Co., Ltd.), 3.0 g of a powdered aromatic polyetheretherketone in a state of sandwiching between aluminum plates through polyimide films was pressed. Thereafter, the sample was slowly cooled to room temperature to prepare a resin material layer having a thickness of 200 µm. Subsequently, the prepared resin material layer was immersed in a reaction solution in which 0.68 g of 10-undecenoyl chloride, 2 g of aluminum trichloride ($AlCl_3$), and 133 g of chloroform were mixed under a nitrogen atmosphere at 60° C. for 7 hours to carry out Friedel-Crafts reaction. Subsequently, the resin material layer after the immersion treatment was immersed in a reaction solution in which 24 g of potassium peroxymonosulfate (oxone) and 12 g of sodium hydrogencarbonate were mixed at room temperature for 12 hours to give a resin material layer after the surface treatment in which the vinyl group of the 10-undecenoyl group was epoxidized.

Figure 7:
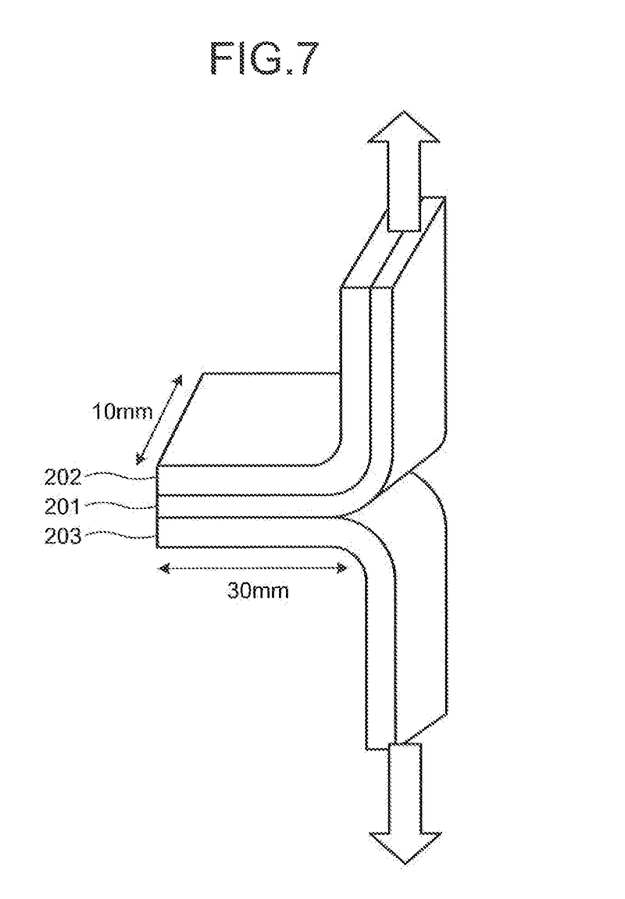
FIG. 7 is an explanatory view of T-peel strength measurement conditions of the resin material layers according to Examples 2 and 3 and Comparative Example 1.

Subsequently, as illustrated in FIG. 7, the obtained resin material layer adhering to each other using epoxy-based adhesive and a T-peel test was carried out in accordance with JIS K6854 or ASTM D1826 to measure adhesion strength. The adhesion conditions are listed below.

Test specimen shape: Length 60 mm and width 10 mm (aluminum foil was interposed to form a part where the layers did not adhere to each other along a length of 30 mm in the length direction)

Adhesion conditions: A mixture in which 100 parts by mass of bisphenol A diglycidyl ether and 87.5 parts by mass of 4-methyl-1,2,3,6-tetrahydrophthalic anhydride as a curing agent were added and thereafter 1.5 parts by mass of 1-methylimidazole was further added as an accelerator was defoamed under vacuum at room temperature for 4 hours, which was used as adhesive, and the obtained specimen was cured by a press machine at 80° C. for 6 hours and at 180° C. for 12 hours Thickness of resin material layers 202 and 203: 0.2 mm Adhesive thickness: As thin as possible to form a uniform adhesive layer Cross head speed: 50 mm/min Example 3

The resin material layer after the surface treatment was prepared in the same manner as Example 2 except that Friedel-Crafts reaction was carried out at 100° C. to evaluate the prepared specimen.

Comparative Example 1

The adhesion strength was evaluated by measurement without carrying out the surface treatment.

Figure 8:
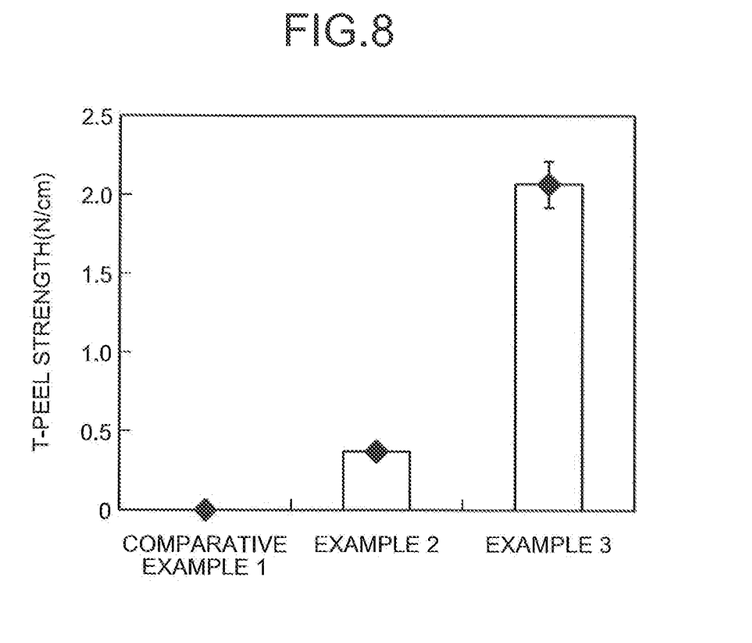
FIG. 8 is a graph illustrating the measurement results of the T-peel strength of the resin material layers according to Examples 2 and 3 and Comparative Example 1.

FIG. 8 is a graph illustrating the measurement results of the T-peel strength of the resin material layers according to Examples and Comparative Example. As illustrated in FIG. 8, it can be seen that the T-peel strength is remarkably improved by carrying out the method for treating the surface of the resin material layer according to the above embodiments (Examples 1 and 2). In contrast, it can be seen that the T-peel strength decreases to ⅕ or lower when the method for treating the surface of the resin material layer according to the above embodiments is not carried out (Comparative Example 1). From these results, it can be seen that the resin material layer having excellent adhesiveness can be obtained by the method for treating the surface of the resin material layer according to the above embodiments.

REFERENCE SIGNS LIST

11 First resin material layer
12 Second resin material layer
13 Third resin material layer
100, 202, 203 Resin material layers
101 Plasma treatment
102 Oxygen radical
103 Hydrophilic functional group
201 Substrate
P Plasma

The invention claimed is:

1. A method for treating a surface of a resin material layer, the method comprising a first step of introducing as a substituent a compound for substitution reaction that is at least one selected from the group consisting of an acid halide and an alkyl halide into an aromatic polyether-based resin included in the resin material layer by Friedel-Crafts reaction.

2. The method for treating a surface of a resin material layer according to claim 1, wherein the substituent has an unsaturated bond.

3. The method for treating a surface of a resin material layer according to claim 1, wherein the aromatic polyether-based resin includes at least one selected from the group consisting of an aromatic polyetherketone, an aromatic polyetheretherketone, an aromatic polyetherketoneketone, an aromatic polyetheretherketoneketone, an aromatic polyetherketone ester, and an aromatic polyethersulfone.

4. The method for treating a surface of a resin material layer according to claim 1, wherein the acid halide is an acid halide having a carbon number of 5 to 15.

5. The method for treating a surface of a resin material layer according to claim 1, further comprising a second step of introducing a hydrophilic functional group into the substituent.

6. The method for treating a surface of a resin material layer according to claim 5, wherein, at the second step, the hydrophilic functional group is introduced by epoxidizing an unsaturated bond in the substituent.

* * * * *